Feb. 28, 1950     C. J. KRAJENKA     2,498,858
PIVOTAL HOOK CLAMP
Filed April 11, 1947

INVENTOR.
Casimir J. Krajenka.
BY
Elmer Jamieson Gray
ATTORNEY.

Patented Feb. 28, 1950

2,498,858

UNITED STATES PATENT OFFICE 2,498,858

PIVOTAL HOOK CLAMP

Casimir J. Krajenka, Detroit, Mich., assignor to Briggs Manufacturing Company, Detroit, Mich., a corporation of Michigan Application April 11, 1947, Serial No. 740,883

2 Claims. (Cl. 24—73)

The present invention relates to an improved clamping device which is especially useful for engaging a member or object subjected to a motivating force and holding it in place against that force; for instance, it may anchor a movable conveyor chain for facilitating its repair.

In order to secure a movable object against undesired movement, or to cause it to move as desired, it is, of course, necessary to operably connect it with some other object or means. How to effect such a connection has given rise to some difficult problems, however. For example, in repairing a movable conveyor chain, it has been the practice to employ complicated and cumbersome block and tackle arrangements for holding the chain in place. Heretofore, no practical and simple device, such as a chain provided with suitable attaching means, has been suggested for securing the conveyor chain to a fixed support to allow its disconnected sections to be brought together.

It is, therefore, one of the objects of the present invention to overcome the usual difficulties encountered in attaching a chain or the like in place or to minimize such difficulties to an important extent and, in so doing, to provide a simple but sturdy clamping device including a movable element or elements which may be actuated readily to place the device in an operative position or an inoperative position, as desired.

It is another object of the invention to provide an improved clamp adapted to be attached to one of the loose ends of a broken conveyor chain for holding it securely to a fixed support, the clamp being especially constructed and arranged to allow the conveyor to be operated for bringing the broken ends of the chain together and holding them there while the necessary repairs are made.

Another object of the invention is to provide a clamping device of the foregoing general character which is simply constructed and inexpensive but rugged and durable, which may be maneuvered or manipulated readily, and which is easy to operate, especially to release, since it is adapted to disengage itself from the members held in place by it.

It is a somewhat more specific object of the invention to provide a clamping device having a fixed hooked element extending in one direction and a swingable hooked element extending in another direction, therefore providing a clamp which is easy to removably attach to the member or members with which it operates.

Finally, it is an object of the invention to provide a simple but sturdy locking arm or detent making it certain that the clamping device remains in its closed or operative position when desired, but which may be moved readily and forcifully, if necessary, to open the clamp for releasing it.

Other objects of this invention will appear in the following description and appended claims, reference being had to the accompanying drawings forming a part of this specification wherein like reference characters designate corresponding parts in the several views.

Figure 1:
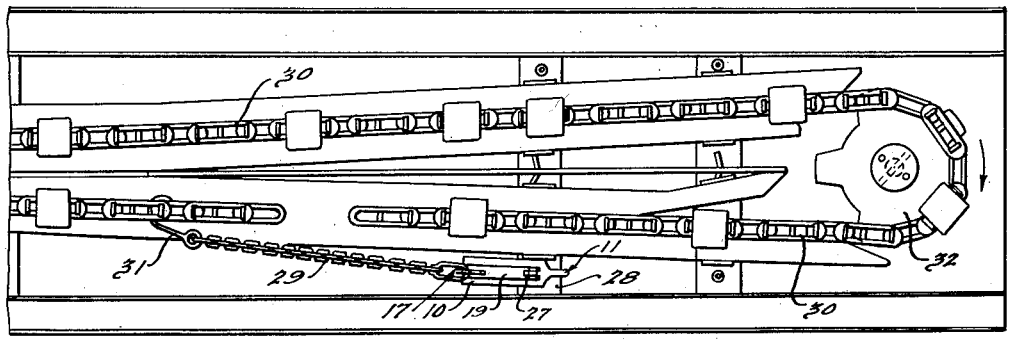
Fig. 1 is a top plan view of a portion of a chain conveyor illustrating one installation of a clamping device constructed in accordance with the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings, there is illustrated by way of example one clamping device constructed in accordance with the present invention. This clamping device includes a generally plate-like base 10 which carries a hook shown as a whole at 11. The shank 12 of the hook 11 is joined to the base 10 so that the hook 11 occupies a position normal to the plane of the base. Accordingly, when the base is generally horizontally positioned, the hook is generally vertically positioned in the manner illustrated in the drawings. The shank 12 may be integrally formed with the base 10 or it may be secured thereto by any suitable connecting means provided that a secure and strong attachment is effected. The shank 12 merges into an arcuate arm or hook portion 13 which terminates in a blunt end spaced from the shank 12 so that the hook portion 13 opens or faces rearwardly, that is, in the direction of the base 10. Accordingly, the hook 11 is conveniently arranged to engage a member with which the clamping device is to be used, as explained more fully hereinafter.

At the end of the base 10 oppositely disposed from the hook 11, there is provided a generally longitudinally extending recess 14. Received within the recess 14 is an angle arm 15 extending from the comparatively elongated body portion 19 of a swingable supporting bar indicated generally at 16. The supporting bar 16 carries a second hook 17 having a shank 20, arcuate arm or hook portion 21 opening forwardly, and blunt end which are similar in structure to the corresponding parts of the hook 11. The shank 20 is firmly secured to the outer surface of the supporting bar 16 by suitable means, such as welding, and the hook 17 faces the hook 11 and is also normal to the plane of the body 10. Although the hooks 11 and 17 are coplanar, they project in opposite directions, that is, one extends downwardly while the other extends upwardly when the body 10 and supporting bar 16 are horizontally positioned.

The angle arm 15 of the supporting bar 16 is provided with a transversely extending bore which registers with a pair of transversely extending openings, one of the latter being located at each side of the base 10 and extending through a wall thereof into the recess 14. Accordingly, a suitable hinge pin or the like, shown at 18, passes through the aligned openings mentioned to hold the bar 16 in assembled relationship with the base 10. But the bar 16 may swing or rotate about this hinge pin 18.

Figure 2:
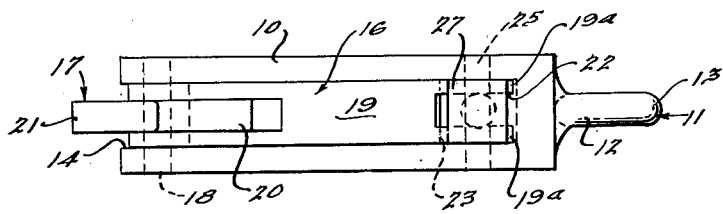
Fig. 2 is a top plan view of the clamp utilized in the installation shown in Fig. 1.

The end of the body 19 of the bar 16 oppositely disposed from the angle arm 15 is provided with a longitudinally extending recess 22. This recess 22 is adapted to overlie and in general to register with a slot 23 in the body 10. Received within the slot 23 is a detent or locking arm shown as a whole at 24. The detent is held within the slot 23 by a hinge pin 25 extending through suitably aligned openings in the walls of the body 10 and in the hub portion of the detent. The detent 24 is provided with a comparatively narrow shank 26 which is adapted to fit within the recess 22, and with a comparatively heavy enlarged head 27. The head 27 extends transversely to overlie the walls of the locking bar 16 and is wider than the recess 22. Thus, it is adapted to contact the top surface of the body portion 19 of the bar 16 at the spaced prongs 19a (Fig. 2) thereof for holding the bar 16 down upon the body 10 when the clamp is closed, as shown in Fig. 2 and as explained more fully hereinafter.

The way in which the present clamping device is utilized for holding a conveyor chain to facilitate its repair is best illustrated in Fig. 1. As there shown, the clamping device is placed in its closed position, that is, the locking bar 16 is swung into a position closely adjacent to and overlying the base 10 and is held therein by the detent 24. The latter is swung into its upright or locking position in which the shank 26 fits into the recess 22 in the body portion 19 of the bar 16. The head 27 serves as a fixed abutment against which the top of the two extending prongs 19a of the body portion 19 press and are held down. Thus, the bar 16 is held in place closely adjacent the body 10. The hook 11 is placed in engagement with a suitable support such as the cross bar 28 of the conveyor mechanism, and an eye or link forming a part of the chain 29 is placed in engagement with the hook 17. The chain 29 is suitably secured to one of the broken ends of the conveyor chain 30; for example, the hook 31 may be employed. Accordingly, the starting mechanism of the conveyor may be operated to rotate the sprocket 32 in the direction of the arrow (Fig. 1) to draw or force the two ends of the conveyor chain to approach each other, the hook 31, chain 29, and the presently discussed clamping mechanism serving to rigidly secure one of the broken ends to the support 28 as the other end is moved toward it. Eventually, the two ends of the chain are brought into close proximity so that the necessary repairs may be made.

Figure 3:
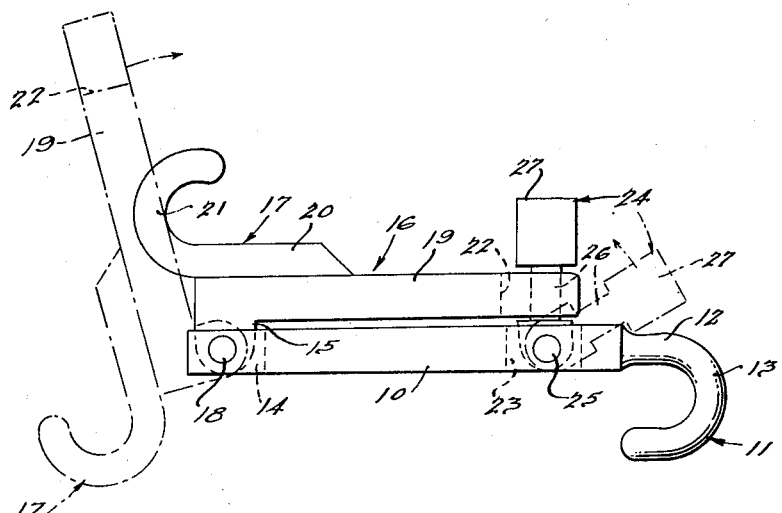
Fig. 3 is a side elevation of the clamp shown in Fig. 2, the parts thereof when in their closed or operative position being shown in solid lines, and when in their open or inoperative position being shown in dotted lines.

After the conveyor chain 30 has been repaired, the chain 29 may be loosened or freed by the simple expedient of swinging the detent 24 from its locking position to its released position; that is, from the upright position shown in solid lines of Fig. 3 to the inclined position indicated by dotted lines in the same view. The detent may be swung into its released position in any appropriate way; but considerable pull is often exerted upon the hook 17 by the chain 29, or its equivalent, attached to the hook. In this event, the body 19 of the swingable bar 16 may be held against the underside of the head 27 of the detent 24 with quite a bit of force. Thus, the detent may be driven into its released position if necessary; for instance, it may be struck with a hammer or sledge, and it is constructed to withstand such a blow. When the detent is released, the pull exerted by the conveyor chain 30 upon the hook 17 through the medium of the hook 31 and chain 29 will immediately swing the bar 16 about its hinge pin 18 into the position generally indicated by the dotted lines of Fig. 3. Such movement of the bar 16 will, of course, loosen the chain 29, the hook 31, and the presently discussed clamping mechanism so that all of these elements either fall away from the chain 30 or may be removed very easily.

While the present clamping mechanism has been discussed chiefly in connection with anchoring the conveyor chain 30 to the support 28, it will be understood that the device may be used for other purposes. It is considered evident that other connecting or restraining members comparable to the chain 29 may be attached to the clamping device; and, in fact, it is adapted for a wide variety of uses in which it is necessary to secure or anchor one member to another one. The clamping device may be directly attached to a pair of members to interconnect them, or it may be used, in general, to fill a need in which some means is required to hold a member or members in place against a force exerted upon them. The present clamping device is very simply constructed but is sturdy and rugged nevertheless, and it may be operated conveniently.

I claim:

1. A clamping device comprising a lower member and an upper member pivoted together at corresponding ends to permit the upper member to swing from a position above and substantially parallel to the lower member upwardly and outwardly to separate said members, an upper hook secured to the pivoted end of the upper member at a locality above the pivotal connection between the members, a lower hook secured to the end of the lower member remote from said pivotal connection, said hooks on the upper and lower members having hook portions disposed respectively above and below said members and opening in opposite directions, and a detent pivoted to the lower member adjacent the hook thereon and swingable from a released position immediately above said lower hook upwardly to a position in which it releasably locks said members together in superimposed relation.

2. A clamping device comprising a lower member and an upper member pivoted together at corresponding ends to permit the upper member to swing from a position above and substantially parallel to the lower member upwardly and outwardly to separate said members, an upper hook secured to the pivoted end of the upper member at a locality above the pivotal connection between the members, a lower hook secured to the end of the lower member remote from said pivotal connection, said hooks on the upper and lower members having hook portions disposed respectively above and below said members and opening in opposite directions, and a detent pivoted to the lower member adjacent the hook thereon and swingable from a released position immediately above said lower hook upwardly into a retaining slot in the free end of the upper member to releasably lock said members together in superimposed relation.

CASIMIR J. KRAJENKA.

REFERENCES CITED

The following references are of record in the file of this patent:

UNITED STATES PATENTS

| Number | Name | Date |
| --- | --- | --- |
| 462,721 | Monroe | Nov. 10, 1891 |
| 647,952 | Fantroy | Apr. 24, 1900 |
| 1,428,775 | Goetz | Sept. 12, 1922 |
| 1,498,239 | Hudgins | June 17, 1924 |